United States Patent [19]

Kobelt

[11] Patent Number: 4,474,075

[45] Date of Patent: Oct. 2, 1984

[54] MULTI-POSITION LOCKABLE CONTROL LEVER ASSEMBLY

[76] Inventor: Jacob Kobelt, 6110 Oak St., Vancouver, British Columbia, Canada, V6M 2W2

[21] Appl. No.: 549,839

[22] Filed: Nov. 9, 1983

Related U.S. Application Data

[63] Continuation-in-part of Ser. No. 219,437, Dec. 23, 1980, abandoned.

[51] Int. Cl.³ .......................... G05G 1/04; G05G 1/00; B60K 20/00; B60K 20/08

[52] U.S. Cl. .......................... 74/526; 74/491; 74/475; 74/523

[58] Field of Search .......................... 74/526, 475, 532, 523, 74/491

[56] References Cited

U.S. PATENT DOCUMENTS

| | | | |
|---|---|---|---|
| 3,019,667 | 2/1962 | Bann | 74/528 |
| 3,048,675 | 8/1962 | Olson et al. | 74/533 |
| 3,287,991 | 11/1966 | Eckert | 74/533 |
| 3,350,957 | 11/1967 | Morse | 74/473 |
| 3,525,272 | 8/1970 | Olson | 74/533 |
| 3,533,301 | 10/1970 | Hausinger | 74/475 |
| 3,863,520 | 2/1975 | Moline et al. | 74/475 |
| 4,106,604 | 8/1978 | Baba | 192/0.098 |

*Primary Examiner*—Lawrence J. Staab
*Assistant Examiner*—Michael D. Bednarek
*Attorney, Agent, or Firm*—Carver & Co.

[57] ABSTRACT

A control head assembly which automatically locks a control lever into one of two or more selected positions, thus reducing chances of accidental disengagement. The lever is relatively stiff and is rotatable between at least two selected positions and is also movable along hinge axis. Stops carried on control head mounting and on lever permit rotation of the lever between the two positions when the stops are disengaged and prevent rotation when the stops are engaged. A spring cooperates with the lever and mounting to permit axial movement for engagement and disengagement and to hold in engagement when lever is in one of the selected positions. The stop on the lever has a particular shape which can be accepted in at least two orientations relative to the stop on the mounting.

19 Claims, 6 Drawing Figures

MULTI-POSITION LOCKABLE CONTROL LEVER ASSEMBLY

CROSS REFERENCE TO RELATED APPLICATION

This is a continuation-in-part of my pending application 06/219,437 filed Dec. 23, 1980.

BACKGROUND OF THE INVENTION

1. Field of the Invention

The invention relates to a control head assembly that automatically locks a control lever thereof into one of two or more selected positions.

2. Prior Art

Manually operated control heads have been used for many years on marine vessels and on other vehicles and apparatus requiring actuation of cables, control rods, pneumatic or hydraulic valves, etc. Previous control heads commonly have several positions and means are often provided to locate the control lever in a particular position that resists a tendancy of the lever to shift from that position due to vibration, accidental knocking or other situations causing creep of the lever with resulting loss of the desired control setting.

Some of these devices have levers which are indexed by movable detents which engage recesses to locate the lever in a desired setting. The indexing means sometimes require manual actuation to disengage the detent from the recess before shifting the lever, which in some devices, requires two handed operation. Two handed operation is inconvenient at times when the other hand is occupied and is not free to disengage the indexing means. Other lever indexing means include a spring-loaded detent which resiliently engages a complementary recess. These spring-loaded types do not actually require two handed actuation, but the levers of such devices are prone to creep due to vibration and/or accidental knocking.

In marine applications, where several selected positions are commonly required, the control lever is commonly made to have an exaggerated flexibility within one plane, and yet to be relatively stiff in a mutually perpendicular plane. A gate means fixed to the control head body is provided with a series of steps or recesses representing control positions which can be selectively engaged by the operator bending the lever in the plane of greater flexibility to disengage a step so as to permit rotation of the lever within the plane having greater stiffness. Devices of this general type are shown in U.S. Pat. Nos. 3,350,957 issued to Morse and 3,287,991 issued to Eckert. Whilst this type of control lever is excellent in many applications, it is not unusual for the lever to be accidentally pushed out of a selected position because commonly the lever is biased by its resilience in such a manner that it can slide off the step under a relatively low force and thus is prone to accidental disengagement which can result in accidents.

U.S. Pat. Nos. 3,048,675 and 3,525,272 both issued to Olson, disclose control heads with relatively stiff levers which are shiftable between series of oppositely facing pins that form mazes through which the levers move to selected positions. Such levers are hinged on rotatable shafts which also permit some rocking of the levers to negotiate the mazes. Whilst these levers are less prone to accidental shifting, the control heads are relatively complex and can be costly to purchase and service. Furthermore, they are usually for applications that require following a step-by-step sequence of operations and thus are not suitable where it might be desirable to avoid using intermediate positions.

Furthermore, many of the prior art multi-position control levers are awkward to use in very cold environments which require operation of the controls with heavily gloved hands. Where operation of the lever requires intricate manipulation due to the relatively complex indexing means, heavily gloved hands increase the difficulty of selecting a particular control position.

SUMMARY OF THE INVENTION

The invention reduces difficulties and disadvantages of the prior art by providing a multi-position lockable control lever having two or more positions which can be selected easily even when the operator wears heavy gloves. Furthermore, the invention is less prone to accidental disengagement than some prior art levers, and is relatively simple in construction, and thus is less costly to produce and maintain than many prior art devices.

A multi-position control lever assembly according to the invention has a mounting and a relatively stiff control lever which does not deflect materially under normal operating forces. The lever is mounted so as to be rotatable relative to the mounting about a hinge axis and within a plane normal to the hinge axis so as to move between at least two selected angularly spaced positions within the plane to control a function. The lever is also mounted so as to be movable axially relative to the mounting along the hinge axis. The lever assembly has a single indexing means having first and second cooperating stop means, one of the stop means being a fixed stop means to prevent movement thereof relative to the mounting, the other stop means being a movable stop means and mounted for concurrent movement with the lever relative to the mounting. The signal indexing means is further characterized by the first stop means having a gate having a pair of opposed gate faces which are spaced apart to define a gap therebetween, the gap extending transversely of the axis, and the second stop means being a limiter means. The first and second stop means have relative shapes which permit relative axial movement between the limiter means and the gate faces with negligible rotation of the lever when the lever is oriented in one of the selected positions in which the stop means are engaged. Each stop means also has a shape which prevents the lever means from moving axially between the gate faces when the lever is oriented in a position intermediate of the two selected positions in which the stop means are disengaged, and when so disengaged, the stop means permit rotation of the lever between the selected positions. The indexing means is further characterized by the movable stop means having a motion limited essentially to axial movement along the hinge axis and rotation about the hinge axis, and the fixed stop means being positioned on the mounting so that a clearance is provided between a portion of the mounting and the fixed stop means. The clearance extends axially a distance greater than axial thickness of the moving stop means so that when the stop means are disengaged by relative axial movement, the movable stop means can sweep through the clearance when the lever is rotated between the two selected positions. The indexing means is also characterized by resilient means cooperating with the first and second stop means to force the first and second stop means into engagement with each other when the lever is oriented in one of the selected positions. When force from the resilient means is overcome to disengage the stop means, the movable stop means can be positioned within the clearance to permit rotation of the movable stop means through the clearance to reflect rotation of the lever. Preferably, a shaft means mounts the lever in the mounting means, the shaft means being journalled for rotation movement about the hinge axis, and for axial movement along the hinge axis. The control lever extends rigidly from the shaft means.

A detailed disclosure following, related to drawings, described preferred embodiments of the invention which is capable of expression in structure other than that particularly described and illustrated.

DETAILED DISCLOSURE

FIGS. 1 through 4

Figure 1:
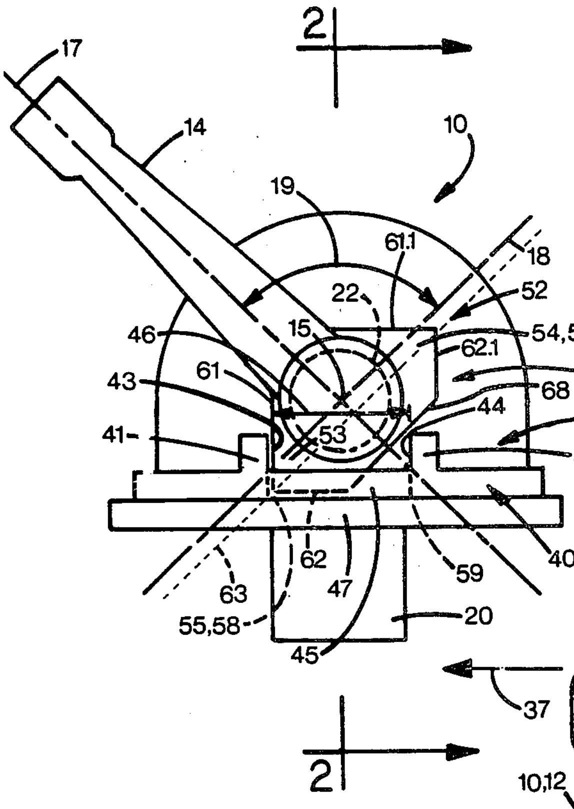
FIG. 1 is a simplified front elevation of a control head assembly according to the invention with a lever thereof shown in an engaged position.

A control head assembly 10 according to the invention has a mounting 12 which is securable to a fixed surface, for example a control table 13 of a marine vessel. The assembly 10 includes a relatively stiff control lever 14 which does not reflect materially under normal operating forces, the lever being rotatable relative to the mounting about a hinge axis 15 and within a plane 16 normal to the hinge axis. The lever can move between at least two engaged positions designated as broken lines 17 and 18 and angularly spaced apart within the plate 16 at an angle 19, which is 90° in this example. The positions can be simple "on-off" positions to control a function, for example to actuate a hydraulic or pneumatic valve 20 positioned beneath the housing and connected to conduits, not shown, extending to corresponding hydraulic or pneumatic devices. Other control connections can be substituted for the valve 20.

The assembly has a shaft 22 which carries the lever 14 at one end and is journalled for rotation about the axis 15 in openings 24 and 25 in side walls 26 and 27 respectively of the mounting. The shaft carries a cam 29 and thus swinging the lever rotates the shaft in the openings 24 and 25 and also rotates the cam which actuates the valve 20. The control lever extends rigidly from the shaft and thus position of the lever is reflected by the shaft which actuates the valve means. The lever is also mounted for axial movement along the hinge axis 15 and thus the cam has a sufficient width 30 to prevent disengagement from the valve 20 and can thus accommodate the axial movement. The shaft 22 has an end 31 remote from the lever 14 which has a blind bore 32 to receive one end of a compression coil spring 34, the spring 34 having an opposite end contained within an end cap 35 secured to the side wall 26. There is sufficient clearance in the end cap to permit the shaft 22 to move a particular distance in the direction of an arrow 37 to compress the spring 34 as will be described. The cam 29 contacts the side walls 26 and 27 at opposite limits of axial movement of the shaft.

Figure 2:
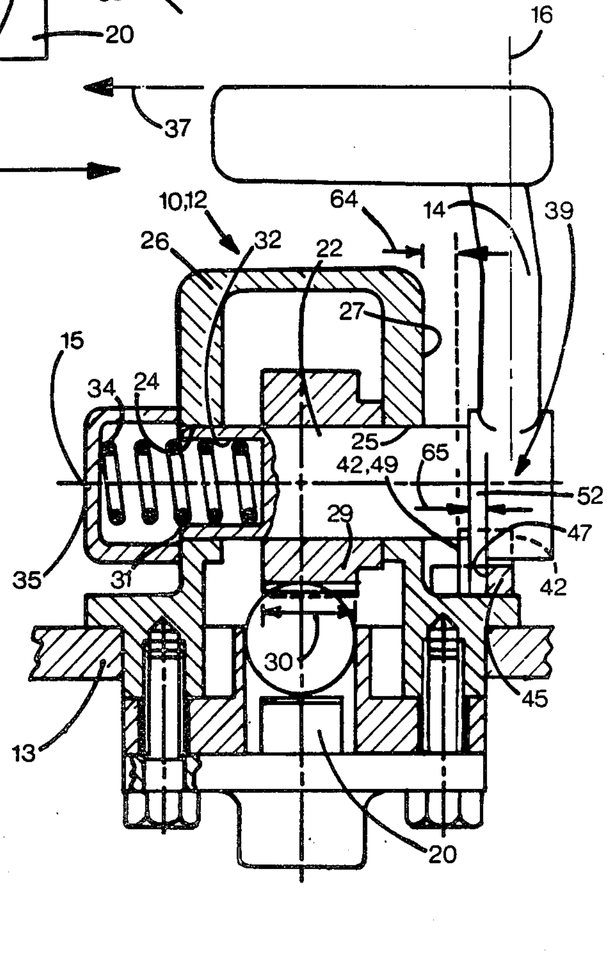
FIG. 2 is a simplified enlarged transverse section through the head taken generally on line 2—2 of FIG. 1 showing the lever in the engaged position.

The control head assembly has signal indexing means 39 having a mounting stop means or gate 40 secured to the mounting 12 by screws 38 passing through undesignated openings in the stop means 40. The means 40 includes a pair of mounting projections 41 and 42 having opposed gate faces 43 and 44 respectively which are spaced apart to define a gap 46 therebetween, the gap extending transversly of the axis 15. The projections 41 and 42 have inner faces 48 and 49 and extend upwardly from, and at right angles to, a base 47 of the mounting and a forward wall 45. The indexing means 39 also includes a limiter means 52 which is mounted for movement with the lever 14 and has a size and shape such that the limiter can pass between the gate faces 43 and 44 of the gap 46 when the lever 14 is oriented relative to the mounting 12 in one of engaged positions as shown in FIG. 1. The limiter 52 has a pair of limiter projections 53 and 54 having opposed limiter corners 55 and 56 which are complementary to opposite mounting corners 58 and 59 defined by the base 47 and the projections 41 and 42 respectively. Each limiter corner is defined by first straight edges 61 and 61.1 and second straight edges 62 and 62.1 disposed at right angles to each other so as to fit within the corresponding mounting corner 58 or 59 of the gate. The lever is shown oriented in an extreme left hand position in which the corner 55 of the limiter is located adjacent to the corner 58 near the projection 41. When the lever is oriented thus, the limiter can pass the projections, ie. can move a portion of the way along the projections, resulting in axial sliding of the shaft until the limiter projection 53 contacts a face of the forward wall 45, or the cam 29 contacts the side wall 27, as seen in FIG. 2 in full outline. The axial movement is effected with negligible rotation of the shaft due to interference between the projections 41 and 53. The control lever extends normally from a limiter axis 63 disposed within a plane of the limiter means and at right angles to the hinge axis 15. Adjacent edges 61 and 62, and 61.1 and 62.1, of each limiter corner 55 and 56 respectively are disposed at forty-five degrees to the limiter axis so that the limiter projections are disposed symmetrically about the limiter axis. The limiter means has a third edge 68 extending parallel to the axis 63 and intersecting the second straight edges 62 and 62.1. The first edges 61 and 61.1 extend from the limiter means in a direction away from the third edge.

Figure 3:
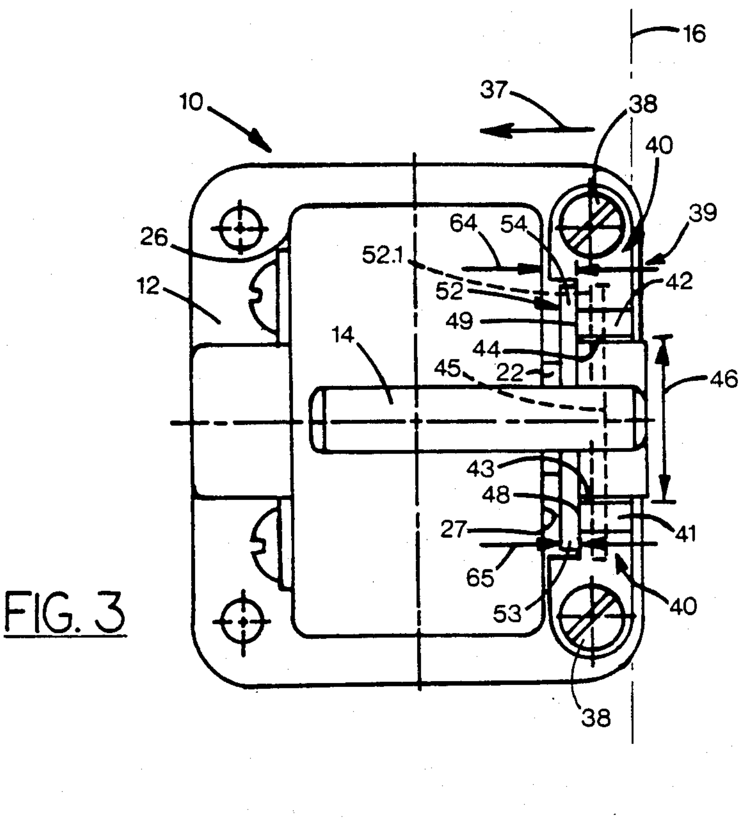
FIG. 3 is a simplified top plan view of the assembly showing the lever and an indexing means of the assembly in full and broken line in disengaged and engaged positions respectively.

As best seen in FIGS. 2 and 3, the inner faces 48 and 49 of the projections 41 and 42 are spaced at a clearance 64 from the side wall 27, which distance is greater than axial thickness 65 of the projections 53 and 54 of the limiter means. Thus when the limiter 52 moves axially along the hinge axis 15 in direction of the arrow 37 and passes the inner faces 48 and 49 of the projections 41 and 42, the projection 53 enters the clearance 64. Because of the relative sizes of the clearance 64 and the projections, 41 and 42, there is sufficient space in the clearance 64 to admit the projections 53 and 54 which can thus sweep the space between the inner faces of the projections and the side wall 27, thus permitting the lever 14 to rotate about the hinge axis 15. Axial movement of the projections within the clearance during such rotation of the lever can be negligible, and results from the relative sizes as above. In FIG. 3, the limiter means 52 is shown in full outline contacting the inner faces 48 and 49 due to force from the spring 34, but there is sufficient clearance for sweeping without this contact. Alos, in FIG. 3, the limiter 52 is shown in broken outline at 52.1 simultaneously in the engaged positions contacting the forward wall 45.

OPERATION

Figure 4:
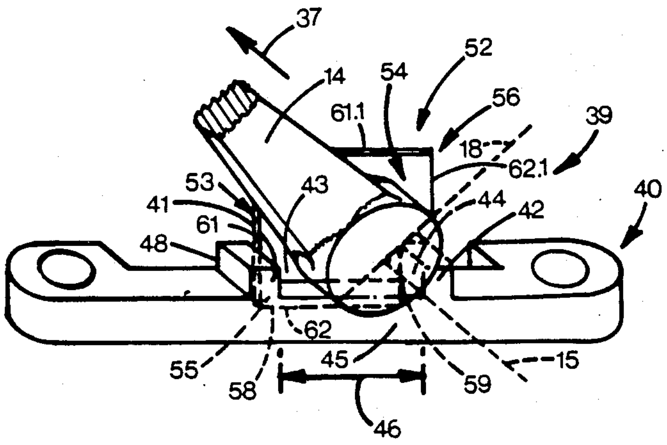
FIG. 4 is a simplified fragmented perspective of the indexing means only of the assembly with the lever shown in the engaged position of FIG. 1.
Figure 5:
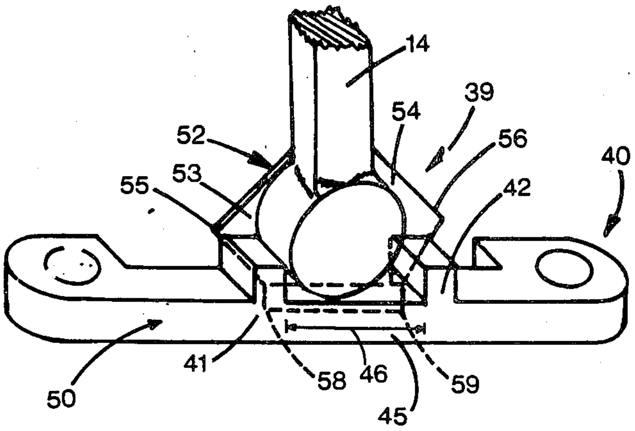
FIG. 5 is a simplified fragmented perspective of the indexing means with the lever shown in an intermediate disengaged position.
Figure 6:
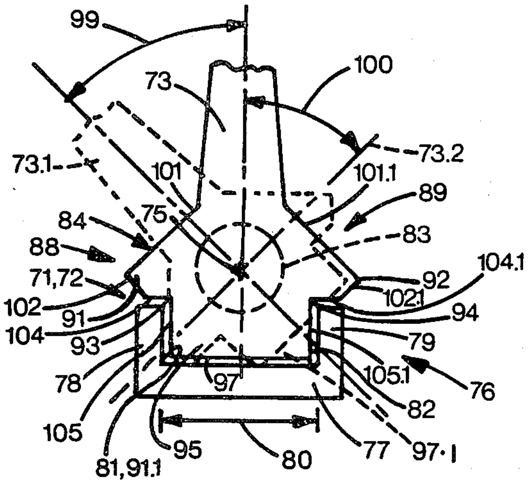
FIG. 6 is a simplified diagram showing an end view of an indexing means only of an alternative three-position control head according to the invention with a lever thereof shown in an engaged intermediate position.

FIGS. 4 and 5

The lever position as shown in FIG. 4 is considered as a first engaged position in which the spring 34 holds the corner 55 of the limiter means 52 within the corner 58 of the stop means, with the projection 53 held closely adjacent the base 47. When the lever 14 is moved towards the mounting in direction of the arrow 37 (best seen in FIG. 3), limiter projection 53 moves in the same direction into the clearance 64, the coil spring 34 is compressed further and thus, if the limiter is rotated a few degrees and released in an intermediate position, the limiter is forced against the stop means or gate 40 by the spring, not shown. This intermediate position is shown in FIG. 5 and it can be seen that the inner faces 48 and 49 of the projections 41 and 42 interfere with the limiter 52 preventing further axial movement of the shaft. If the limiter is swung to the second engaged position so that the corner 56 of the limiter projection 54 registers with the corner 59 of the stop means, and the handle is then released, the spring 34 forces the limiter 52 again into the gap 46 to contact the wall 45. This second position is shown as 18 and clearly is equivalent and opposite to the first position of FIGS. 1 and 3.

Thus, to disengage the limiter from the stop means when the lever is in either of the two engaged positions requires the spring 34 to be compressed so that the limiter 52 moves out of engagement with the corners 58 or 59 and into the clearance 64 to permit the corners 55 or 56 to sweep through the clearance 64 until one of the corners of the limiter is again aligned with one of the corners 58 or 59 so that the lever attains one of the two engaged selected positions. The position of the control lever 14 is thus easily changed by gripping the mounting and lever in one hand and squeezing to compress the spring 34 to disengage the stop means. The lever can then be rotated to attain a different position, after which the grip can be released. Alternatively, the lever only can be gripped in one hand and shifted axially a short distance prior to rotation to select a different position. It can be seen that both of these actions are simple, one handed actions that can be performed quickly in adverse conditions, even with a heavily gloved hand. Clearly these movements do not require separate disengagement of locking means before moving the levers in contrast to some prior art lever assemblies.

It can be seen that the two mounting projections 41 and 42 with respective opposed gate faces 43 and 44 serve as a first stop means 50 which is fixed relative to the mounting. Furthermore, it can be seen that the limiter means 42 on the shaft 22 serves as a second stop means or a movable stop means cooperating with the lever and the first stop means to permit rotation of the lever between the two positions when the stop means are disengaged, and to prevent rotation of the lever when the stop means are engaged. The resilient mounting of the limiter means permits axial movement relative to the first stop means for engagement and disengagement of the stop means, and to hold the stop means in engagement when the lever is in one of the engaged positions. This requires that the shaft means mounting the lever in the mounting means is journalled for rotational movement about the hinge axis and for resilient axial movement along the hinge axis, and that the lever extends rigidly from the shaft means. Thus, the movable stop means, ie. the limiter means, has a motion limited essentially to axial movement along the hinge axis and to rotation about the hinge axis. These two distinct movements can only occur when the lever and the limiter means are in particular positions. It can be seen that the spring 34 serves as a resilient means cooperating with the first and second stop means to force the first and second stop means into engagement with each other when the lever is in one of the selected positions. It can be seen that, with the limiter means 52 made integral with the shaft and lever, there are very few components to this simple yet effective control head assembly.

ALTERNATIVES AND EQUIVALENTS

As illustrated, a compression coil spring concentric with the hinge axis is used as the resilient means to hold the stop means in engagement, and also to permit disengagement. Clearly, alternative resilient means and alternative means of mounting the lever can be substituted. For example, the lever could be mounted for rotation and axial movement of a fixed spindle and also could be provided with a cam for actuating the valve. Alternative limiter means could be provided remote from the lever to permit engagement and disengagement of the stop means. The wall 45 could be eliminated and the cam 29 would prevent excessive axial movement of the shaft 22 by contacting the side wall 27.

Furthermore, it can be seen that the first stop means is a fixed stop means positioned externally of the mounting and spaced at a clearance from the mounting sufficient to accommodate lateral movement of the second stop means. Also, it can be seen that the second stop means is a movable stop means and is movable along the hinge axis relative to the mounting to permit engagement and disengagement of the stop means. Also, the resilient means is seen to apply a force to the first stop means tending to force the second stop means away from the mounting to engage the first stop means. Clearly, with an alternative arrangement of the stop means, not shown, the resilient means could be adapted to apply a force tending to force the second stop means towards the mounting to engage the first stop means. Also, the first means could be positioned internally of the mounting and the second stop means would then also be mounted within the mounting on the shaft. As a further alternative, the stop means 40 can be removed merely by removing the screws 38, thus permitting the lever 14 to operate without stops, thus increasing range of swinging until stopped by other means.

FIG. 6

An alternative three-position indexing means 71 for an alternative three-position control head assembly 72 is to be described. It can be understood that multi-position control heads having more than three positions can be envisaged with suitable design of first and second stop means.

The control head assembly 72 has a lever 73 which is shown fragmented and in full outline in a central engaged position. The assembly 72 also has a gate or mounting stop means 76 having a pair of spaced mounting projections 78 and 79 extending upwardly from and disposed normally to a base 77. The projections are spaced apart at a spacing 80 and, with the base 77, define a pair of opposite mounting corners 81 and 82. The lever 73 is mounted on, and extends rigidly from, a shaft 83, broken outline, to permit axial movement of the lever along a central axis 75 of the shaft, and a limiter means 84 is mounted with the lever for similar axial movement.

The limiter means 84 has a pair of limiter projections 88 and 89 having protruding limiter corners 91 and 92 and re-entrant corners 93 and 94 respectively. The limiter corners 91 and 92 are defined by first straight edges 101, 101.1 and second straight edges 102, 102.1 respectively, similarly to the limiter means 52, each second edge having the respective re-entrant corner therein. The re-entrant corner 93 and 94 are defined by fourth straight edges 104, 104.1 and fifth straight edges 105, 105.1, the fourth edges intersecting adjacent second edges and the fifth edges intersecting a third edge 97 to define a generally rectangular portion 95. Thus, the rectangular portion 95 extends from the two re-entrant corners and has a width and depth sufficient to fit in the spacing 80 between the mounting projections 78 and 79 and the base 77 when the lever 73 is positioned as shown. It can be seen that upper portions of the mounting projections 78 and 79 are received in the re-entrant corners 93 and 94 respectively. The limiter means 84 is thus generally complementary to the stop means of the lever.

Similarly to the previously described embodiment of FIGS. 1 through 5, the lever 73 can be moved along the shaft axis 75 so that the limiter means 84 passes the projections into a clearance, not shown, equivalent to the clearance 64 which is sufficient to permit the limiter projections to clear the stop means and mounting, to permit rotation of the lever. When the limiter means 84 is in the clearance, the lever can be rotated through an angle 99, which in this example is 45 , so that it assumes a broken outline position 73.1. When the lever is released, a spring, which is not shown but is equivalent to the spring 34 of FIG. 1, forces the lever and limiter means into the spacing 80. In this new position, the corner 91 of the limiter means assumes a broken outline position 91.1, and is received within the corner 81 defined by the mounting projection 78 and the base 77. It can be seen that this is equivalent to the position shown in FIGS. 1 and 4, and that rotation of the lever is thus prevented by interference of the limiter means between the corners. It is noted that, in this position, the third edge 97.1 (broken outline) of the rectangular portion 95 clears an upper portion of the projection 79.

Clearly, the lever can be again moved from the central position, in full outline, in an axial direction to withdrawn from the spacing 80 to permit rotation in an opposite direction through an angle 100. The angle 100 is also 45° and the lever attains a second position, not shown, in which an axis of the lever is shown as 73.2. In the second position, the protuding corner of the limiter means is received in the corner 82 in a similar manner to prevent rotation. It is noted that the base 77 does not extend upwardly sufficiently to interfere with the limiter means 84 in some positions, and thus the cam, not shown, or other means can serve as a stop to limit axial movement of the shaft 83. Alternatively, height of the base 77 can be increased to form a wall having a face to interfere with the limiter, thus limiting said axial movement in a manner similar to the FIG. 1 embodiment.

In summary, the alternative lever means has three distinct engaged positions spaced apart at 45° to each other, and clearly, with suitable design of the limiter and mounting stop means, different angular spacings between the engaged positions can be selected to take advantage of the simple structure of the present invention. For both embodiments and alternatives, the first stop means is so shaped that it can be accepted by the second stop means to prevent lever rotation only when the lever is one of the selected positions.

I claim:

1. A multi-position control lever assembly having a mounting and a relatively stiff control lever which does not deflect materially under normal operating forces, the lever assembly having a signal indexing means having first and second cooperating stop means, one of the stop means being a fixed stop means to prevent movement thereof relative to the mounting, the other stop means being a movable stop means mounted for concurrent movement with the lever relative to the mounting, the assembly being further characterized by:

(a) the lever being mounted so as to be rotatable relative to the mounting about a hinge axis and within a plane normal to the hinge axis so as to be movable between two selected angularly spaced positions within the plane to control a function, the lever also being mounted so as to be movable axially relative to the mounting along the hinge axis, and the signal indexing means being further characterized by:

(b) the first stop means having a gate having a pair of opposed gate faces which are spaced apart to define a gap therebetween, the gap extending transversely of the axis, and the second stop means being a limiter means, the first and second stop means having relative shapes which permit relative axial movement between the limiter means and the gate faces with negligible rotation of the lever when the lever is oriented in one of the selected positions in which the stop means are engaged, each stop means also having a shape which prevents the lever means from moving axially between the gate faces when the lever is oriented in a position intermediate of the two selected positions in which the stop means are disengaged, and, when so disengaged, the stop means permit rotation of the lever between the selected positions, (c) the movable stop means having a motion limited essentially to axial movement along the hinge axis and to rotation about the hinge axis, and the fixed stop means being rigidly secured on the mounting so that a clearance is provided between a portion of the mounting and the fixed stop means, the clearance extending axially a distance greater than axial thickness of the moving stop means so that when the stop means are disengaged by relative axial movement, the lever can be rotated between the two selected positions and the movable stop means can sweep through the clearance, (d) resilient means cooperating with the first and second stop means to force the first and second stop means into engagement with each other when the lever is oriented in one of the selected positions, and when force from the resilient means is overcome to disengage the stop means, the movable stop means can be positioned within the clearance to permit rotation of the movable stop means through the clearance to reflect rotation of the lever.

2. A control lever assembly as claimed in claim 1 in which the stop means are further characterized by:

(a) the gate includes a portion of the base, and a pair of mounting projections extending from the base and having the opposed gate faces, the gate also having opposite mounting corners defined by the base and the mounting projections extending therefrom, (b) the limiter means has a pair of limiter projections having opposed limiter corners which are complementary to the mounting corners, so that, in one selected position, one particular limiter corner is positioned closely adjacent one particular mounting corner to permit only axial movement of the limiter means through the gate, interference between the particular corners essentially preventing rotation of the lever means.

3. A control lever assembly as claimed in claim 2 in which the stop means are further characterized by:

(a) the mounting projections extending normally from the base so that the opposed gate faces are parallel, and the opposite mounting corners are right angles, (b) each limiter corner of the limiter projection is defined by adjacent first and second straight edges disposed at right angles to each other so as to fit within the corresponding mounting corners of the gate.

4. A control lever assembly as claimed in claim 3 in which:

(a) the second stop means is the movable stop means, and the first stop means is the fixed stop means, (b) the control lever is fixed relative to and extends normally from a limiter axis disposed within a plane of the limiter means and at right angles to the hinge axis, the adjacent edges of each limiter corner being disposed at 45 degrees to the limiter axis so that the limiter projections are disposed symmetrically about the limiter axis.

5. A control lever assembly as claimed in claim 4 in which the limiter means is further characterized by:

(a) a third edge extending parallel to the limiter axis and intersecting the second straight edges of the limiter corners, the first straight edges extending from the limiter corners in a direction away from the third edge.

6. A control lever assembly as claimed in claim 5 in which the assembly has a third selected position disposed between the two selected positions, and in which the limiter means is further characterized by:

(a) each second edge having a re-entrant corner therein, each re-entrant corner being defined by fourth and fifth straight edges, the fourth edges intersecting adjacent second edges and the fifth edges intersecting the third edge at right angles to define a generally rectangular portion extending from the two re-entrant corners, the rectangular portion and the re-entrant corners are shaped so as to fit in the gap between the mounting projections when the lever attains the selected third position intermediate of the two said selected positions.

7. A control lever assembly as claimed in claim 1 in which:

(a) the first stop means is the fixed stop means which is fixed relative to the mounting, (b) the second stop means is the movable stop means which is movable with the lever.

8. A control lever assembly as claimed in claim 1 in which:

(a) the first stop means is the fixed stop means which is positioned externally of the mounting and spaced from an outer wall of the mounting to provide the said clearance between the portion of the mounting and the fixed stop means.

9. A control lever assembly as claimed in claim 1 further characterized (a) shaft means mounting the lever in the mounting means, the shaft means being journalled for rotational movement about the hinge axis and for axial movement along the hinge axis, (b) the control lever extending rigidly from the shaft means.

10. A control lever assembly as claimed in claim 1 further characterized by:

(a) the resilient means being a coil spring mounted concentrically with the hinge axis.

11. A control lever assembly as claimed in claim 1 in which the moving stop means is integral with the lever.

12. A control lever assembly as claimed in claim 3 further characterized by:

(a) shaft means mounting the lever in the mounting means, the shaft means being journalled for rotational movement about the hinge axis and for axial movement along the hinge axis, (b) the control lever extending rigidly from the shaft means.

13. A control lever assembly as claimed in claim 4 further characterized by:

(a) shaft means mounting the lever in the mounting means, the shaft means being journalled for rotational movement about the hinge axis and for axial movement along the hinge axis, (b) the control lever extending rigidly from the shaft means.

14. A control lever assembly as claimed in claim 5 further characterized by:

(a) shaft means mounting the lever in the mounting means, the shaft means being journalled for rotational movement about the hinge axis and for axial movement along the hinge axis, (b) the control lever extending rigidly from the shaft means.

15. A control lever assembly as claimed in claim 6 further characterized by:

(a) shaft means mounting the lever in the mounting means, the shaft means being journalled for rotational movement about the hinge axis and for axial movement along the hinge axis.

16. A control lever assembly as claimed in claim 12 further characterized by:

(a) the first stop means is the fixed stop means which is fixed relative to the mounting, (b) the second stop means is the movable means which is movable with the lever.

17. A control lever assembly as claimed in claim 13 further characterized by:

(a) the first stop means is the fixed stop means which is fixed relative to the mounting, (b) the second stop means is the movable means which is movable with the lever.

18. A control lever assembly as claimed in claim 14 further characterized by:

(a) the first stop means is the fixed stop means which is fixed relative to the mounting, (b) the second stop means is the movable means which is movable with the lever.

19. A control lever assembly as claimed in claim 15 further characterized by:

(a) the first stop means is the fixed stop means which is fixed relative to the mounting, (b) the second stop means is the movable means which is movable with the lever.

* * * * *